United States Patent [19]
Seymore

[11] 3,837,747
[45] Sept. 24, 1974

[54] WASHER/SQUEEGEE

[76] Inventor: Ulysee Seymore, 12248 Meyers Rd., Detroit, Mich. 48227

[22] Filed: Jan. 30, 1973

[21] Appl. No.: 327,996

[52] U.S. Cl.............. 401/25, 401/205, 401/207, 15/121, 251/328, 251/329
[51] Int. Cl.............................. A47l 1/08
[58] Field of Search ...... 15/121; 401/16, 18, 22–27, 401/37, 39, 188, 204–207, 263, 280, 281

[56] References Cited
UNITED STATES PATENTS

| 1,767,079 | 6/1930 | Kenyon | 401/280 X |
| 2,959,801 | 11/1960 | Pelham | 401/281 |
| 2,997,732 | 8/1961 | Gilchrist et al. | 401/207 |
| 3,079,628 | 3/1963 | Wright | 401/204 |
| 3,455,638 | 7/1969 | Braswell | 401/207 X |

FOREIGN PATENTS OR APPLICATIONS

| 60,599 | 3/1939 | Norway | 401/26 |
| 96,304 | 5/1960 | Norway | 401/205 |
| 118,664 | 1/1927 | Switzerland | 401/205 |
| 1,335,070 | 7/1963 | France | 401/22 |
| 462,441 | 3/1951 | Italy | 401/26 |
| 1,273,242 | 9/1962 | France | 401/139 |

Primary Examiner—Daniel Blum
Attorney, Agent, or Firm—Harness, Dickey & Pierce

[57] ABSTRACT

A self-contained, cleaning appliance is comprised of a tubular shaped handle forming a liquid reservoir and including an end portion detachably connected to a receptacle carrying washer and squeegee elements. The washer element is in selective fluid communication with the reservoir in response to selective positioning of a valve means operatively supported by the receptacle. In a preferred construction, the receptacle, handle, and valve means are fabricated from a plastic material.

5 Claims, 2 Drawing Figures

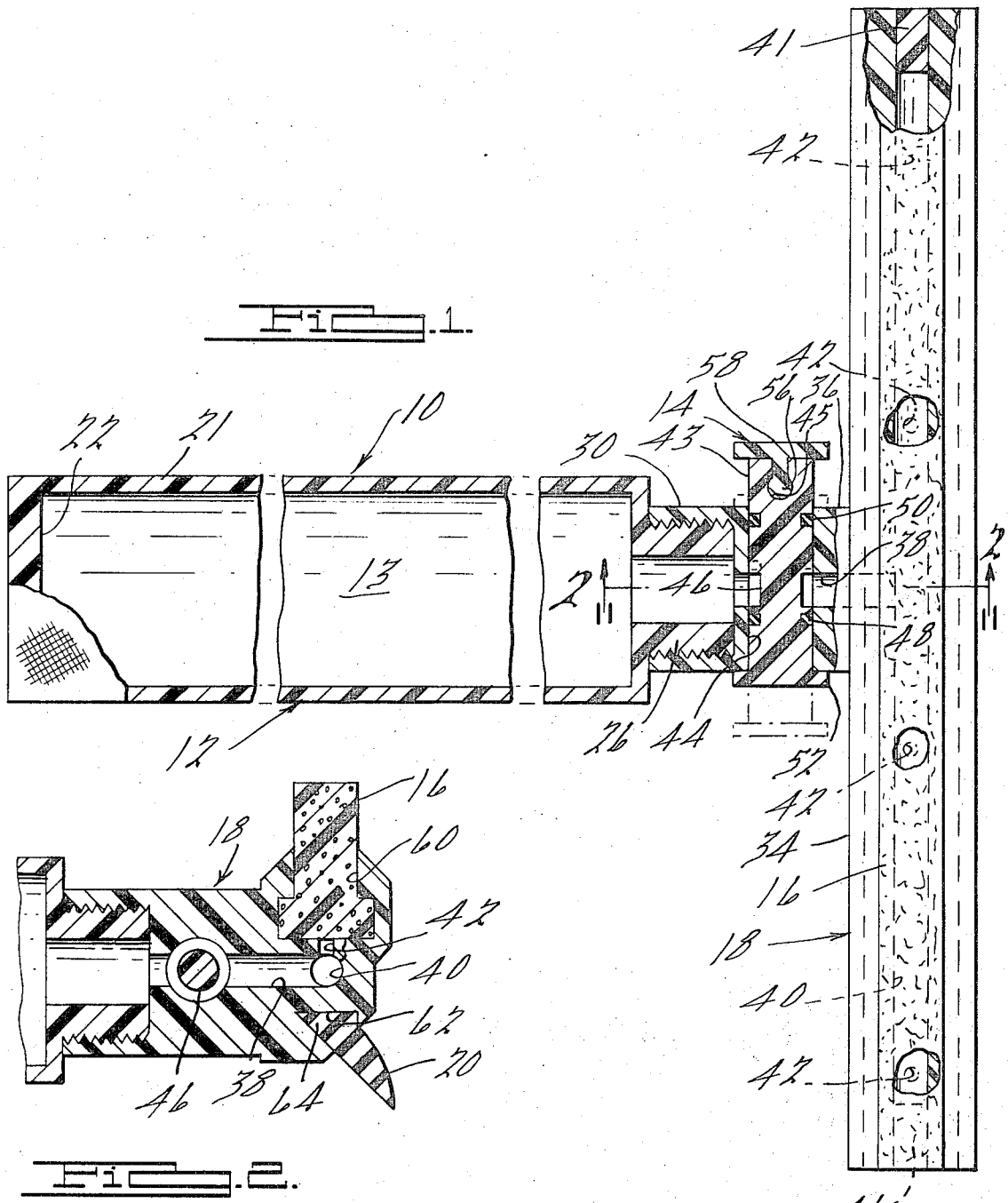

WASHER/SQUEEGEE

SUMMARY OF THE INVENTION

The subject invention relates generally to cleaning appliances and more particularly to a self-contained washer/squeegee finding particular useful application in the washing and wiping of glass window surfaces and the like.

In accordance with the subject invention, an improved washer/squeegee appliance is provided which is light weight due to being substantially fabricated from a plastic material, and which is self-contained by virtue of a liquid reservoir being formed by a hollow handle member. It therefore is a general object of the subject invention to provide a light weight washer/squeegee which is also self-contained whereby to eliminate any requirement for supplementary fluid sources such as water hoses or liquid containing pails.

In another aspect of the subject invention, the washer and squeegee elements are supported by a receptacle which is detachably connected to the handle. The receptacle is provided with a plurality of interconnecting fluid passages which define a flow path between the reservoir and the washer element. An "on-off" type valve is provided for selectively introducing the liquid stored in the handle to the washer element. It is therefore another object of the subject invention to provide a washer/squeege appliance which includes the facility of introducing a selective amount of liquid to the washer element.

The subject invention will find utility in washing walls in addition to glass window surfaces. For such purposes, it has been found that a washer element is advantageously formed from a material such as felt, whereas for a window cleaning application, a sponge-like material is preferred. In the washer/squeegee of the subject invention, the washer element is removably connected to the receptacle via insertion in an integrally formed slot. This type of connection facilitates replacement of the washer element in accordance with the application. It is therefore a further object of the present invention to provide a washer/squeegee appliance of the above character which is provided with interchangeable and replaceable washer elements whereby to facilitate universality of application.

It is still a further object of the present invention to provide a new and improved cleaning appliance of the above character that is of relatively simple design, is fabricated from a plastic material by conventional molding techniques, and is therefore economical to commerically manufacture.

Other objects, features, and advantages of the present invention will become apparent from the following detailed description taken in conjunction with the accompanying drawings.

BRIEF DESCRIPTION OF THE DRAWINGS

FIG. 1 is a plan view of a preferred washer/squeegee appliance in accordance with the subject invention with various portions broken away to illustrate the internal arrangement and construction thereof; and FIG. 2 is a fragmentary sectional elevation of the washer/squeegee illustrated in FIG. 1 taken along the lines 2—2 thereof.

DETAILED DESCRIPTION OF THE PREFERRED EMBODIMENT

For convenience of description, the terms "upper," "lower," "right," "left," and words of similar import will have reference to the various members and components of the washer/squeegee assembly of the present invention as arranged and illustrated in FIGS. 1 and 2 of the drawings and described hereinafter in detail. Likewise, the terms "inner," "outer," and derivatives thereof will have reference to the geometric center of such members and the various portions or sections thereof.

Referring now in detail to the drawings, a washer/-squeegee assembly in accordance with an exemplary embodiment of the present invention is indicated generally at 10. The assembly 10 is comprised of a longitudinally extending handle 12 which forms a reservoir 13 for a suitable liquid cleaning agent or solvent, a valve means 14 for selectively communicating the agent stored in the handle to a washer element 16, and a laterally extending receptacle 18 which supports the element 16 and also a squeegee element indicated at 20 (see FIG. 2).

The handle 12 and receptacle 18 are each formed from a suitable plastic material. In the preferred construction, the handle 12 is blow molded from polyethylene (PE) and the receptacle 18 is injection molded from acrylonitrile-butadiene-styrene (ABS). Dimensionally the handle 12 is preferably about 1½ inches in diameter and 20 inches in length, whereas the lateral span of the receptacle 18 is about 9 inches.

In the subject invention, the washer/squeegee assembly 10 is self-contained by virtue of a liquid reservoir 13 formed in the handle 12. The handle 12 is comprised of an elongated tubular section or sleeve 21 closed at its left end by an integral, circularly shaped, wall 22, and including an externally threaded neck or mouth section 26 located at an opposite end which is detachably connected to an internally threaded nipple 30 of the receptacle 18.

In addition to the nipple, the receptacle 18 also includes a head or element supporting section 34 which extends traversely in opposite directions relative to the axis of the handle 12. In the subject assembly the liquid cleaning agent or solvent stored in the reservoir 13 is communicated to the washer element 16 via a fluid passage system formed in the receptacle 18. In this regard the nipple 30 is provided with a fluid passage 38 which extends between the mouth section 26 of the handle 12, and a traversely extending passage 40, the latter extending through opposite end faces of the head 34. Each of the outward ends of the passage 40 are fluidly sealed by cylindrically shaped, closer plugs 41 inserted therein. As best seen in FIG. 2, the passage 40 is in fluid communication with an inner surface of the washer element 16 via a plurality of spaced, upwardly extending fluid passages 42. It therefore will be seen that in response to proper positioning of the valve means 14, fluid may be communicated from the internal reservoir 13 through the passages 38, 40 and 42 to the washer element 16.

While various types of either rotary or slidable valve plugs can be used to control the flow of liquid from the reservoir 13, in a preferred construction, valve means 14 is comprised of a cylindrically shaped valve plug element 43 slidably located in a laterally or traversely extending passage 44 formed in the nipple 30, the plug 43 being provided with an annularly shaped recess or port 46 which permits liquid transfer when in registration with the passage 38. The recess 46 is fluidly sealed on opposite axial ends thereof by a pair of spaced O-rings 48 and 50 located in circumferentially extending grooves formed in the outer peripheral surface of the plug 43. To facilitate locating the plug 43 in proper "open" and "closed" positions relative to the passage 38, one end of the plug 43 is provided with an enlarged circumferentially shaped flange 58 which engages the adjacent surface of the nipple 30 when the plug is in the "closed" position. Correspondingly, a second flange 52 is located on the opposite end of the plug 43 for locating the valve means 14 in an "open" position. To facilitate assembly of the valve means 14, the flange 58 is a separate member which includes an integral stem 56 having an enlarged spherically shaped bulb on an outer end. The plug 44 is provided with a complementary shaped passage 45 whereby the stem 56 is press fitted into engageable connection therein. After insertion, due to the enlarged shape of the bulb relative to the diameter of the outward portion of the passage 45, the flange will be securely retained or connected to the plug 43. If desired, an adhesive, such as glue or cement, can be used to further strengthen the connection.

As indicated previously, the receptacle 18 supports the washer and squeegee elements 16 and 20, respectively. In this regard and as best seen in FIG. 2, the member 18 includes a T-shaped slot 60 which extends laterally across the span of the head 34. In accordance therewith, the cross section of element 16 is formed in a complementary T-shape to facilitate slidable insertion therein. Preferably, the cross sectional dimensions of the element 16 are slightly larger than the corresponding dimensions of the slot 60 so that the element 16 can be snugly and cooperatively received and retained in a manner to preclude lateral slippage. With respect to materials, the element 16 can be provided in a plurality of materials for accommodation of the various applications of the washer/squeegee 10. For example, for washing glass surfaces such as windows, the element 16 is preferably formed from a sponge or foam material, whereas for wall washing a felt material is preferred.

To facilitate wiping the surface after cleaning, a suitable wiper strip in the form of the squeegee element 20 is provided on the opposite lower side of the head 34. The squeegee 20 is located in a generally triangularly shaped groove or recess 62 which is adapted to cooperatively receive a complementarily formed insertable section 64 formed on the inward end of the element 20. If desired, a suitable adhesive can also be utilized to cement the complementary sections of the groove 62 and the section 64.

In operation, the handle 12 is threadably removed from the holder member 18 to facilitate filling the internal reservoir 13 with an appropriate cleaning liquid agent or solvent. The handle 12 is then reattached to the holder member 18 and the valve means 14 is located in its "open" position. To fluidly communicate the liquid in the reservoir 13 to the washer element 16, the receptacle 18 is oriented in a downward position relative to the reservoir 13 to permit fluid transfer by gravity. When the washer element 16 is sufficiently saturated with the cleaning liquid, the valve means 14 is closed and the assembly is rubbed over the surface to be cleaned. Thereafter the liquid film is removed by wiping with the squeegee.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

What is claimed is:

1. A self-contained, cleaning appliance comprising a squeegee element;
a washer element formed from an absorbent material;
receptacle means for supporting said elements, said means including passage means in fluid communication with said washer element and a second passage extending transversely relative to said passage means; a hollow handle defining a fluid reservoir in communication with said passage means, and detachably connected to said receptacle means;
valve means located in said passage means for selectively controlling the flow between said washer element and said reservoir, said valve means including a cylindrically shaped plug having an annular shaped recess slidably located in said second passage; and
first and second seal means carried by said plug on opposite sides of said recess for fluidly sealing said plug relative to said second passage.

2. The appliance as recited in claim 1 wherein said plug has a first position with said recess being located in said passage means whereby to permit fluid communication thereacross, and a second position with said recess being spaced from said passage means whereby to block fluid communication thereacross and wherein said valve means includes stop means on an opposite end of said plug for selectively locating said plug in said first and second positions, respectively.

3. The appliance as recited in claim 1 wherein said receptacle means is substantially T-shaped to define an element holder section and a neck section, said holder section including a passage which extends through oppositely spaced end faces, and wherein said appliance includes plug means having a cross-section conforming to said passage and insertably located in opposite ends of said passage relative to said end faces.

4. The appliance as recited in claim 3 wherein said receptacle means includes slot means extending substantially parallel with said passage and extending through each of said end faces whereby to facilitate slidable insertion and removal of said washer element and further including a plurality of transversely extending passages communicating said passage with said slot means.

5. A self-contained cleaning appliance comprising:
a handle defining a fluid reservoir adapted to receive a cleaning liquid, said handle being formed from an elastomeric material and including an elongated tubular shaped section having an integrally formed, transversely extending end wall at one end and a coaxial, externally threaded, annular shaped section at an opposite end, said externally threaded section having a diameter less than the diameter of said tubular shaped section; a T-shaped receptacle defining a neck section and an integral holder section located at one end of said neck section, a first passage extending between oppositely spaced end faces of said holder section, a second passage located in said neck section and extending between said first passage and an opposite end of said neck section, an internally threaded counterbore located at said opposite end of said neck section and cooperatively engaged to said externally threaded section of said handle, a third passage located in said neck section between said counterbore and said first passage and extending transversely relative to said second passage, a T-shaped recess located in an outer surface of said holder section and extending between said opposite end faces and parallel to said first passage, a plurality of spaced apertures communicating said recess and said first passage, and a generally wedge-shaped recess located on an opposite side of said holder section relative to said T-shaped recess;

an inverted T-shaped washer element removably located in said T-shaped recess, said element being formed from a liquid absorbent material;

a squeegee element located in said wedge-shaped recess; first and second cylindrically shaped plugs located at opposite ends of said first passage, an outer end of each of said plugs being substantially flush with the end faces of said holder section; and valve means for selectively controlling the flow of cleaning liquid between said handle and said receptacle, said valve means comprising a cylindrically shaped plug slidably located in said third passage, an integral radially enlarged flange located at one end of said plug, an inwardly extending passage located at an opposite end of said plug, an enlarged spherically shaped opening located at an inward end of said last mentioned passage, a radially enlarged flange having a stem press-fitted in said last mentioned opening, said stem including an enlarged bulb disposed in said spherically shaped opening, a circumferentially extending recess formed in an outer peripheral surface of said plug and axially spaced between said flanges, first and second seals located between said circumferentially extending recess and each of said flanges for fluidly sealing said plug relative to said third passage.

* * * * *